(12) United States Patent
Tashev et al.

(10) Patent No.: US 8,503,694 B2
(45) Date of Patent: Aug. 6, 2013

(54) SOUND CAPTURE SYSTEM FOR DEVICES WITH TWO MICROPHONES

(75) Inventors: Ivan J. Tashev, Kirkland, WA (US); Tyler S. Gleghorn, Renton, WA (US); Slavi Mihov, Sofia (BG)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 12/144,662

(22) Filed: Jun. 24, 2008

(65) Prior Publication Data
US 2009/0316929 A1 Dec. 24, 2009

(51) Int. Cl.
*H04B 15/00* (2006.01)
(52) U.S. Cl.
USPC .......................................................... 381/94.1
(58) Field of Classification Search
USPC .......................................................... 381/94.1
See application file for complete search history.

(56) References Cited

U.S. PATENT DOCUMENTS

| | | | |
|---|---|---|---|
| 6,002,776 | A | 12/1999 | Bhadkamkar et al. |
| 6,449,586 | B1 | 9/2002 | Hoshuyama |
| 6,594,367 | B1 | 7/2003 | Marash et al. |
| 7,046,812 | B1 | 5/2006 | Kochanski et al. |
| 7,113,605 | B2 | 9/2006 | Rui et al. |
| 7,274,794 | B1 | 9/2007 | Rasmussen |
| 7,970,564 | B2 * | 6/2011 | Wang et al. ...................... 702/66 |
| 2005/0080616 | A1 | 4/2005 | Leung et al. |
| 2007/0110257 | A1 | 5/2007 | Dedieu et al. |

FOREIGN PATENT DOCUMENTS
WO 2006096959 A1 9/2006

OTHER PUBLICATIONS

Gareta, Alberto Abad, "A Multi-Microphone Approach to Speech Processing in a Smart-Room Environment", Date: Feb. 2007, 186 Pages.
Maj, Jean-Baptiste, "Adaptive Noise Reduction Algorithms for Speech Intelligibility Improvement in Dual Microphone Hearing Aids", Date: Jun. 2004, 188 Pages.
Valin, et al., "Robust Recognition of Simultaneous Speech by a Mobile Robot", Date: Aug. 2007, pp. 742-752, vol. 23, Issue: 4.
Wiltgen, Timothy E., "Adaptive Beamforming using ICA for Target Identification in Noisy Environments", Date: May 9, 2007, 70 Pages.

\* cited by examiner

*Primary Examiner* — Howard Weiss
(74) *Attorney, Agent, or Firm* — Microsoft Corporation

(57) ABSTRACT

The perceptual sound quality of desired audio signals (e.g., human voice) captured by an electronic device (e.g., cell phone) are improved by reducing ambient noise according to an algorithm that acts upon audio signals captured from a front and rear direction. More particularly, audio signals captured by two directional microphones pointing in opposite directions (e.g., a front microphone which receives audio signals from a forward direction and a rear microphone which receives audio signals from a rear direction) are classified and subsequently enhanced (e.g., unwanted signals are suppressed) according to a probability of their source (e.g., front, rear, or noise) thereby providing an improved perceptual sound recording than each microphone individually. The resultant signals provide decreased noise since the contribution of the front and rear microphones are taken into consideration and the signal from the more relevant (e.g., in the direction from which sound is coming) microphone is utilized.

20 Claims, 10 Drawing Sheets

SOUND CAPTURE SYSTEM FOR DEVICES WITH TWO MICROPHONES

BACKGROUND

Small electronic devices, such as web cameras or cellular phones, need to capture sounds in severe noise conditions or when a talker is at some distance from the device. In general, mobile or hand held electronic devices are engineered to make the signal (e.g., speaker's voice) to noise (e.g., everything from the outside world besides the speaker's voice) ratio high. This happens when the device is hold close to the mouth. A high signal to noise ratio provides a high perceptual sound quality without requiring any additional processing. When the device is moved away from the mouth the signal to noise ratio becomes low, leading to lower perceptual audio quality.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The perceptual quality of desired audio signals (e.g., human voice) captured by an electronic device is improved by reducing ambient noise according to an algorithm that acts upon audio signals captured from a front and rear direction. More particularly, audio signals captured by two directional microphones pointing in opposite directions (e.g., a front microphone configured to receive audio signals from a forward direction and a rear microphone configured to receive audio signals from a rear direction) are classified and subsequently enhanced according to the probability of their source (e.g., front or rear), thereby providing an improved quality sound recording than each microphone individually.

Essentially, signals captured from a front and a rear microphone are enhanced by increasing the suppression of the opposite signal (e.g., rear signal in a front channel and front signal in a rear channel). A set of features (e.g., the level difference for a whole frame feature, the time of arrival for a whole frame feature, the level difference per frequency bin feature, and the time of arrival per frequency bin feature) is extracted based on the difference between the suppressed audio signals in the front and rear channels for each frame and frequency bin. A probability that the captured audio signal is from the front or from the rear is calculated for respective features of the set of features. The respective probabilities are combined to form an overall probability. The front and rear suppressed audio signals are enhanced (e.g., unwanted signals further suppressed) based on the overall probability of a front or rear source. The resulting enhanced audio signal provides decreased noise since the contribution of the front and rear microphones are taken into consideration and the audio signal from the more relevant microphone is utilized (e.g., microphone in the direction from which the sound is coming).

The real time execution of the above method depends on a certain number of parameters (minimal gains, prior probabilities, etc.). These parameters are estimated off-line and optimized for achieving improved perceptual sound quality using wide range of test recordings.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
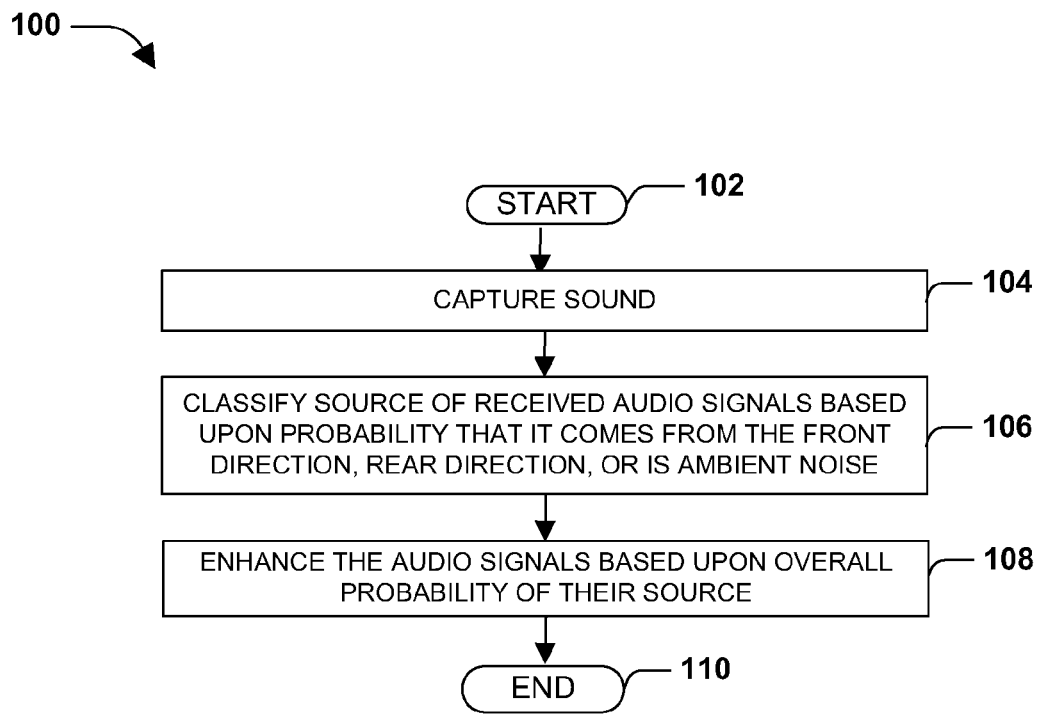
FIG. 1 is a flow chart illustrating an exemplary method of improving the quality of audio signals captured by an electronic device by capturing audio signals from two microphones facing opposite directions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Most electronic devices use a single microphone integrated into the devices. However, a single microphone does not work well in situations where the speaker's mouth is not near the single microphone because the microphone captures larger amounts of ambient noise and reverberation therefore making the captured sound unusable (e.g., with a low signal to noise ratio). To address this problem and thereby increase the signal to noise ratio people may use headsets if they need good sound quality or incorporate microphone arrays configured to perform beamforming into their devices. Headsets are awkward and limit mobility, while microphone arrays needed for beamforming require a significant amount of space and do not easily fit into today's small sized electronics.

The problem of increased signal to noise ratio of captured sound will further increase with the approach of fourth generation communication systems (4G) which will offer increased broadband access to internet and video phones capabilities. In video phones users will hold the device one to two feet from their face. This increased distance between the microphone and the speaker's mouth will increase the ratio of signal to noise ratio since the microphone will capture the same noise signal, but the voice signal from the speaker's mouth will be ten times weaker since it has further to travel. Another similar situation occurs when a video phone is used as a camcorder. The screen acts as a viewfinder while the camera is on opposite side. Microphones placed on the screen (e.g., viewfinder) side will result in a poor sound quality on the camera side and microphones placed on the camera side will result in a poor sound quality on the screen side. Therefore, there is a need to have reliable sound capturing capabilities in these and similar situations.

The present techniques and systems, provided herein, relate to a method by which the perceptual quality of desired audio signals (e.g., human voices) captured by an electronic device (e.g., cellular phone) are improved by reducing ambient (e.g., background) noise according to an algorithm that acts upon audio signals captured from a front and rear direction. More particularly, audio signals captured by two directional microphones pointing in opposite directions (e.g., a front microphone configured to receive audio signals from a forward direction and a rear microphone configured to receive audio signals from a rear direction) are classified according to the probability of their source (e.g., front source, rear source, side source, etc.). The audio signals are then enhanced according to their source, effectively suppressing audio signals coming from an unwanted direction and resulting in an improved audio signal that uses only the audio signal from the more relevant microphone (e.g., the audio signal from the front).

FIG. 1 is a flow chart illustrating an exemplary method 100 for enhancing the quality of sound captured by an electronic device capturing sound from two microphones facing opposite directions. More particularly, the method 100 captures a sound (audio signal) from two microphones pointing in opposite directions and serves to improve the perceptual quality of captured audio signals by suppressing an audio signal coming from an unwanted direction (e.g., a direction opposite the direction of the nearest microphone). It will be appreciated that the method set forth below can be applied to a broad range of applications, comprising but not limited to cellular phones, video recording devices, web cameras, etc.

At 104 an electronic device (e.g., cellular phone, video camera, web camera, etc.) captures a sound from an external source. Two directional microphones facing in opposite directions (front and rear microphones) receive the sound. In one example, sounds are captured by at least one front microphone (e.g., a microphone facing in a forward direction from the electronic device) and one rear microphone (e.g., a microphone facing in a backward direction from the electronic device) and are converted to audio signals (e.g., electrical signals).

The audio signals are classified according to a probability of their source at 106. An audio signal can be classified as either coming from a front source (e.g., direction), coming from a rear source (e.g., direction), or as noise. Classification of the audio signals can be dependent upon a set of features extracted from a difference between captured signals from the front and rear microphones. For each feature of the set of features, a probability of a source (e.g., from the front, from the rear, noise) of its associated signal is calculated. A combination of the probabilities of all the features in a set (overall probability) is determined, taking into consideration that for a given signal a probability of one feature may be more reliable than a probability of another. The overall probability may be enhanced (e.g., optimized) and used to classify the audio signals by source.

The audio signals are enhanced according to the overall probability of their source (e.g., front source or rear source) for a plurality of frequency bins and time frames at 108. Enhancement of an audio signal provides an improved perceptual sound quality than each microphone could individually provide. Enhancement of the audio signals suppresses signals which have been classified as noise (e.g., signals which have a high probability of being noise) for respective frequency bins and time frames. Likewise, signals that are classified as coming from an unwanted direction (e.g., signals that have a high probability of coming from a direction with a low probability) will also be suppressed for respective frequency bins and time frames. Therefore, the enhanced audio signals will have undesirable signals removed and thereby improve the captured sound quality.

Figure 2:
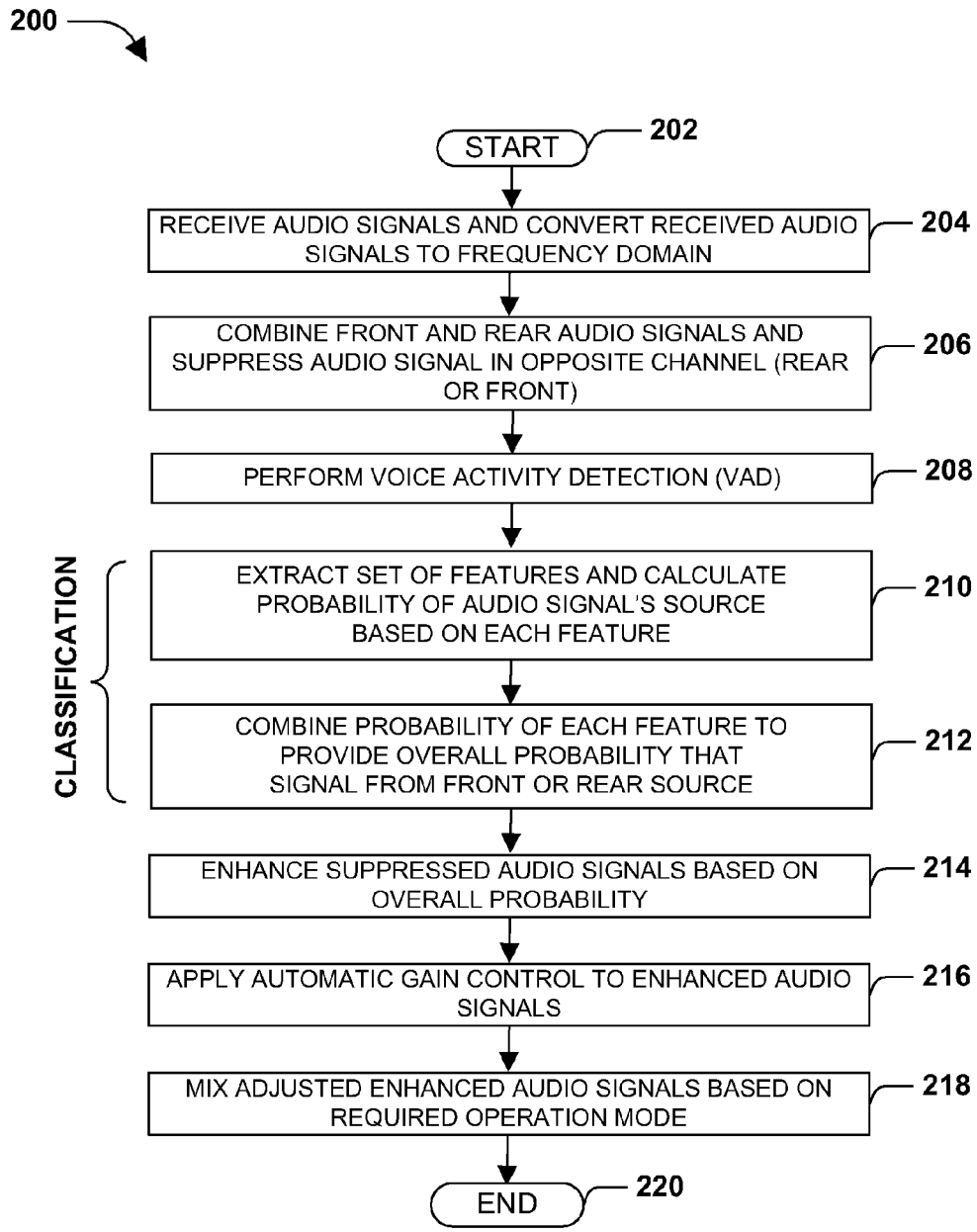
FIG. 2 is a more detailed flow chart illustrating an exemplary method of improving the quality of audio signals captured by an electronic device by capturing audio signals from two microphones facing opposite directions.
Figure 3:
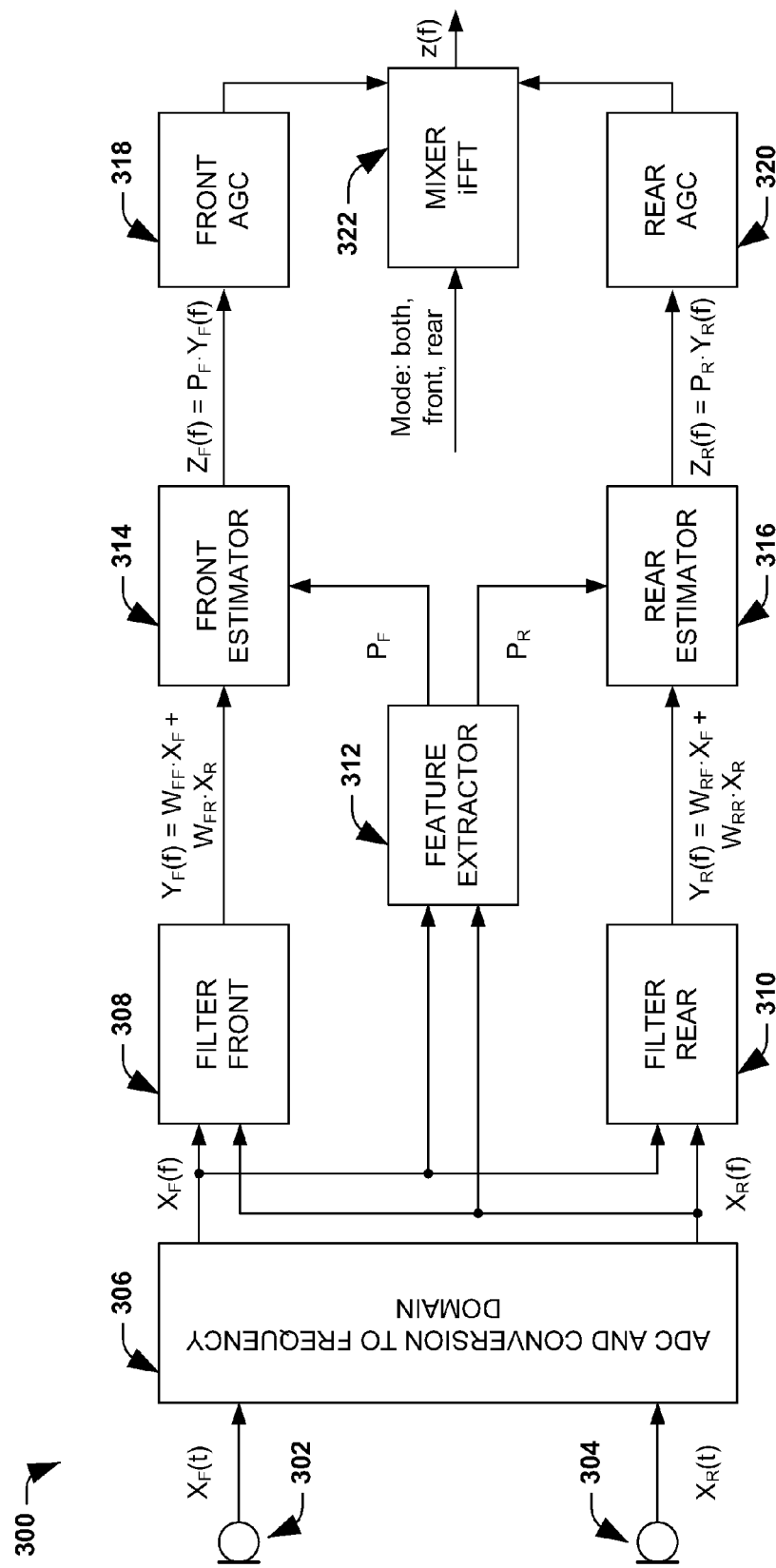
FIG. 3 illustrates a block diagram of an audio processing architecture set forth herein.

FIG. 2 is a flow chart illustrating a more detailed example of a method of improving the quality of audio signals captured by an electronic device capturing audio signals from two directional microphones facing opposite directions. FIG. 3 illustrates a block diagram 300 of an audio processing architecture according to the flow chart of FIG. 2. The audio processing architecture of FIG. 3 comprises a front channel (e.g., comprising: 302, 308, 314, 318) and a rear channel (e.g., comprising: 304, 310, 316, 320) for respective front and rear channel processing.

At 204 captured audio signals are converted from the time domain to the frequency domain. A sound is captured by two microphones, a front microphone 302 and a rear microphone 304. The front microphone 302 and rear microphone 304 input captured audio signals $x_F(t)$ and $x_R(t)$, respectively, to the analog to digital converter (ADC) and conversion to frequency domain block 306. The captured audio signals $x_F(t)$ and $x_R(t)$ go through analog to digital conversion (e.g., convert an analog audio signal to a digital audio signal). The captured audio signals are also segmented into a plurality of audio frames n (e.g., 256 samples) and converted to the frequency domain (denoted $X_F(f)$ and $X_R(f)$ by using a fast Fourier transform (FFT), or Modulated Complex Lapped Transform (MCLT), or any other method for conversion to frequency domain. The frequency domain audio signals $X_F(f)$ and $X_R(f)$ are a spectra of complex numbers which arrive every single audio frame n (e.g. a 20 mS sample of the signal).

The frequency domain audio signals $X_F(f)$ and $X_R(f)$ are input into a front filter 308 and a rear filter 310, respectively, where they are combined and the opposite frequency domain audio signal is suppressed (e.g., $X_R(f)$ is suppressed for the front channel and $X_F(f)$ is suppressed for the rear channel) at 206. The front filter 308 receives $X_F(f)$ and $X_R(f)$, which are filtered in a certain way to achieve the suppressed audio signal $Y_F(f)$. The rear filter 310 also receives $X_F(f)$ and $X_R(f)$, which are filtered in a different way to achieve the suppressed audio signal $Y_R(f)$. The filtering performed by both the front filter 308 and the rear filter 310 increases the maximum contrast (e.g., difference) between front and rear audio signal, $X_F(f)$ and $X_R(f)$. For example, the suppressed audio signal $Y_F(f)$ has as much as possible from the front audio signal and as little as possible from the rear audio signal, while the suppressed audio signal $Y_R(f)$ has as much as possible from the rear audio signal and as little as possible from the front audio signal.

At 208 voice activity detection is performed. Voice activity detection can be performed by a feature extractor 312. Voice activation detection is a method by which the algorithm can determine whether or not a suppressed audio signal (e.g., $Y_F(f)$ or $Y_R(f)$) is speech or noise. If the voice activity detection determines a suppressed audio signal is a noise frame, the parameters of the ambient noise may be updated. If the voice activity detector determines a suppressed audio signal is a speech (e.g., voice) frame the method proceeds to find the probability that the suppressed audio signal is from a front source, a rear source, or a side source.

A set of features are extracted from the difference between the front and rear audio signals (e.g., suppressed audio signals $Y_F(f)$ and $Y_R(f)$, frequency domain audio signals $X_R(f)$ and $X_F(f)$) and a probability is calculated for respective features at 210. In FIG. 3, $Y_F(f)$ and $Y_R(f)$ together with $X_R(f)$ and $X_F(f)$ are input into the feature extractor 312. The feature extractor 312 extracts a set of features from the difference between the front and rear audio signals. Two probability vectors $p_F$ and $p_R$ (e.g., probabilities that we have signal from the front or rear direction for every time frame and frequency bin) are calculated for each of the features.

In one example, a set of four features are extracted. The first feature is level (e.g., energy) differences between the front and the rear suppressed audio signals $Y_F(f)$ and $Y_R(f)$ for a whole frame (e.g. a 20 mS sample of the signal). If the suppressed audio signal has a higher front level (e.g., energy) than rear level it indicates that someone is talking from the front. If the suppressed audio signal has a higher rear level than front level it indicates that someone is talking from the rear. If the suppressed audio signal has a substantially equal signal level from the front and rear it indicates that someone is talking from the side. The second feature is the time of arrival difference between the front and the rear frequency domain audio signals for a whole frame. The time of arrival difference estimates the time of arrival difference for a frequency domain audio signals $X_R(f)$ and $X_F(f)$ between the front and rear microphones. The third feature is the level (e.g., energy) difference between the front and rear suppressed audio signals $Y_F(f)$ and $Y_R(f)$ per frequency bin (e.g., each of 256 frequencies). The fourth feature is the time of arrival difference per frequency bin, which determines the difference in time of arrival between the front and rear frequency domain audio signals $X_R(f)$ and $X_F(f)$ for each frequency bin.

At 212, the probability of respective features of a set of features are combined together to provide an overall probability that an audio signal is from a front or a rear source. For example, the four features are cumulatively combined to form a probability model providing the probability of an audio signal's location (e.g., calculate an overall probability that the signal is a front or a rear signal). The overall probability for the k-th frequency bin of the n-th frame can be estimated for both front and rear probabilities (e.g., using the front and rear probability vectors $p_F$ and $p_R$ for each of the features) as:

$$p_k^{(n)} = ((1-G_W)p_W^{(n)} + G_W)((1-G_D)p_D^{(n)} + G_D)((1-G_{Wb}) p_{Wbk}^{(n)} + G_{Wb})((1-G_{Db})p_{Dbk}^{(n)} + G_{Db})$$

Where $p_W^{(n)}$, $p_D^{(n)}$, $p_{Wbk}^{(n)}$, and $p_{Dbk}^{(n)}$ are probabilities associated with the front or rear audio signal of the four features (respectively, level difference for a whole frame, time of arrival difference for a whole frame, level difference per frequency bin, and time of arrival difference per frequency bin) and $G_W$, $G_D$, $G_{Wb}$, and $G_{Db}$ are time and frequency independent minimal gains. The minimal gains determine how much a corresponding feature (e.g., belonging to a set of features) can be trusted. For example, a gain value close to 1 means that a feature has a low level of trust (e.g., the feature has a small contribution to the overall probability relative to other features of the set) and a gain value close to 0 means that a feature has a high level of trust (e.g., the feature has a large contribution to the overall probability relative to other features of the set).

The suppressed audio signal in the front channel or rear channel is enhanced based on the overall probability at 214. Enhancement is of the front suppressed audio signal $Y_F(f)$ may be performed by a front estimator 314 and enhancement of the rear suppressed audio signal $Y_R(f)$ may be performed by a rear estimator 316. Enhancement according to the front and rear estimators, 314 and 316) use the suppressed audio signals output of by the front 308 and rear 310 filters, $Y_F(f)$ and $Y_R(f)$, and the overall probability provided by the feature extractor 312, $p_F$ and $p_R$, to provide an improved estimate of an audio signal that has just front source components or just rear source components. Accordingly, audio signals that have a high probability of coming from an unwanted direction will be suppressed, resulting in an enhanced audio signal, $Z_F(f)$ or $Z_R(f)$, with improved captured sound quality.

At 216 amplification of the enhanced audio signals $Z_F(f)$ and $Z_R(f)$ are automatically adjusted, by a process known as automatic gain control (AGC). As is well known in the art, AGC can be performed by an adaptive system wherein an average output signal level is fed back to adjust the gain to an appropriate level for a range of input signal levels. In FIG. 3, a first adaptive system and a second adaptive system automatically adjust the incoming enhanced audio signals $Z_F(f)$ or $Z_R(f)$ based upon their strength. For example, weaker enhanced audio signals receive more gain and stronger enhanced audio signals receive less gain or none at all.

A mixer 322 mixes the front and rear adjusted enhanced audio signals $Z_F(f)$ and $Z_R(f)$ with each other based on the operation mode at 218. For example, in the case of a cellular phone only a front signal mode is needed when a person is talking on a phone which is either closely positioned to the mouth or held in a way that the person can see the screen in a video phone mode. Alternatively, a rear signal mode may be used when the phone or the small device is used to capture video (e.g., when the camera is on the opposite side of the screen). Both the front and rear signal modes can be used when a user wants to use the phone as a camcorder in addition to recording her voice. There could also be a conference call mode, when the phone lays on the table, in which both front and rear signals are suppressed since sound is only coming from the sides and noise comes from up and down. Once the adjusted enhanced audio signals are mixed, a reverse Fourier transformation is performed to return the mixed audio signals to the time domain.

The real time execution of the method of FIG. 2 depends on a certain number of optimization parameters (e.g., minimal gains, prior probabilities, etc.). These optimization parameters are estimated off-line during the design process where they are optimized for achieving best perceptual sound quality using wide range of test recordings. For example, a set of files comprising samples of clean speech are played through a speaker and recorded with ambient noise by a device. The files are processed offline and the perceptual quality is measured (e.g., by MOS). The optimization is then run to determine parameter values which are stored in the program.

Figure 4:
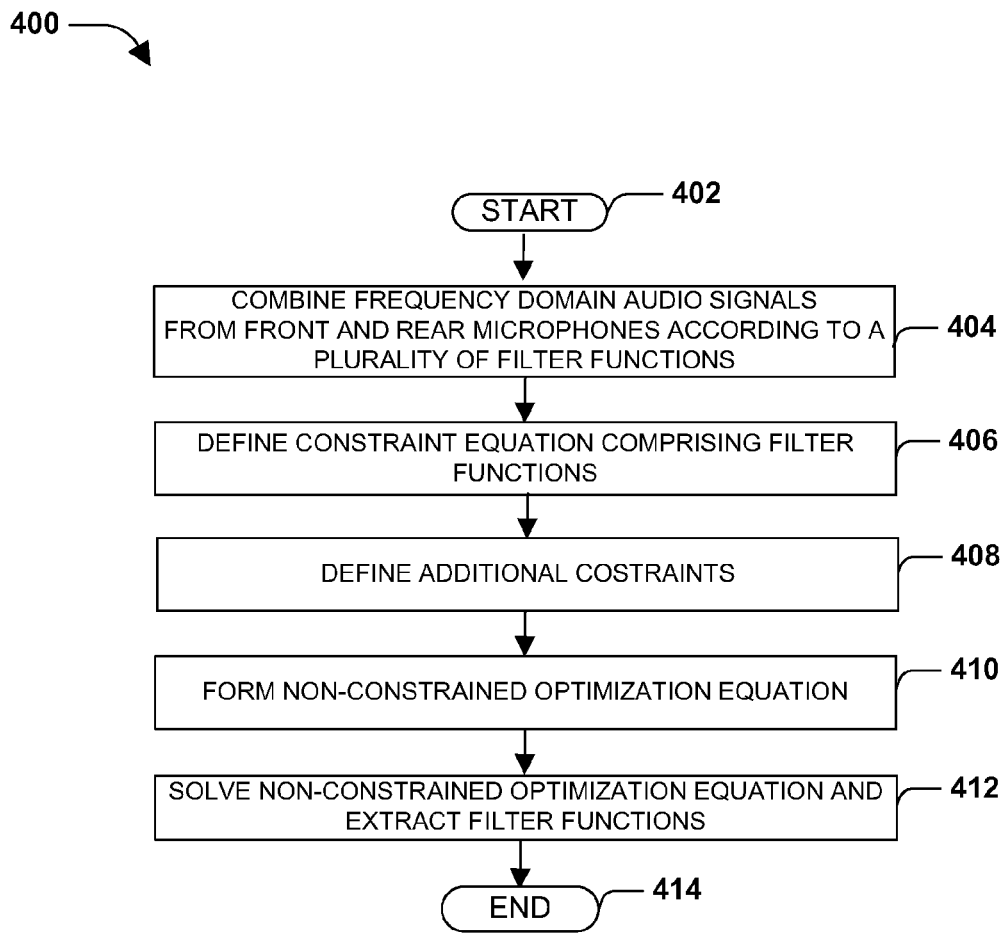
FIG. 4 is a flow chart illustrating an exemplary method for improving the signal suppression as performed by the filters of FIG. 3.

Once the optimization parameters are estimated they are stored in the device performing the method. Optimization of the optimization parameters can be achieved using a wide range of optimization programs. FIG. 4 illustrates an example of one possible optimization method 400 that can be used to determine (e.g., optimize) the optimization parameters (e.g., minimal gains which determine the impact that each feature of a set has on the overall probability). In method 400 a non-constrained optimization equation is formed from a constrained equation comprising the unknown optimization parameters and additional constraints (e.g., a punishing factor that gives boundaries of the permitted value of the non-constrained optimization equation). The non-constrained optimization equation can be enhanced using numerical methods (e.g., gradient descent method) to solve for the unknown optimization criteria (e.g., inter alia minimal gains). More particularly, method 400 serves to enhance the front frequency domain audio signal $X_F(f)$ to maximize the energy captured from the front direction (e.g., ±30° from the direction the front microphone is pointing) and to enhance the rear frequency domain audio signal $X_R(f)$ to maximize the energy captured from the rear direction (e.g., ±30° from the direction the rear microphone is pointing).

At 404 the front frequency domain audio signal $X_F(f)$ and the frequency domain audio signal $X_R(t)$ are combined according to a plurality of unknown filter functions. The operation the front 308 and rear 310 filters perform the enhancement can be determined by information stored in a plurality of unknown filter functions (e.g., unknown variables in vector form). The unknown filter functions are initially unknown, but are determined (e.g., enhanced) during the enhancement process. Once the unknown filter functions are determined they become enhanced filter functions and information is extracted from them and used to operate filters according. For example, the enhanced $Y_F^{(n)}$ are $Y_R^{(n)}$ defined in relation to the filter functions (e.g., known or unknown), $W_{FF}$, $W_{FR}$, $W_{RF}$, $W_{RR}$ according to the following equations:

$$Y_F^{(n)} = W_{FF} \cdot X_F^{(n)} + W_{FR} \cdot X_R^{(n)}$$

$$Y_F^{(n)} = W_{FF} \cdot X_F^{(n)} + W_{RR} \cdot X_R^{(n)}$$

where n is the frame of the audio signal. $W_{FF}$ and $W_{FR}$ are filter functions related to the front filter 308 and $W_{RF}$ and $W_{RR}$ are related to the rear filter 310. The filter functions $W_{FF}$, $W_{FR}$, $W_{RF}$, $W_{RR}$ are vector comprising scalar values that relate to the operation of the front and rear filters, 308 and 310, on the incoming signals, $X_F(f)$ and $X_R(f)$.

At 406 a constraint equation is defined. The constraint equation is a mathematical relation comprising the unknown filter functions that can be enhanced (e.g., optimized) in a non-constrained optimization equation to determine enhanced (e.g., optimized) values of the unknown filter functions. For example, constraint equations $Q_{Fconst}$ and $Q_{Rconst}$ can be defined as the ratio of the average energy captured in front (e.g., +/−30°) of the microphone to the average energy captured in rear (e.g., +/−150°) of the microphone as shown in the following equation for $Q_{Fconst}((Q_{Rconst})$ is the ratio of the average energy captured in the rear of the microphone to the average energy captured in the front):

$$Q_{Fconst} = \max_{W_{FF}, W_{FR}} \left( \frac{\int_{-\Delta\theta}^{+\Delta\theta} (W_{FF} \cdot X_F(\theta) + W_{FR} \cdot X_R(\theta)) d\theta}{\int_{-\pi-\Delta\theta}^{\pi-\Delta\theta} (W_{FF} \cdot X_F(\theta) + W_{FR} \cdot X_R(\theta)) d\theta} \right)$$

$$Q_{Rconst} = \max_{W_{RF}, W_{RR}} \left( \frac{\int_{-\Delta\theta}^{+\Delta\theta} (W_{RF} \cdot X_F(\theta) + W_{RR} \cdot X_R(\theta)) d\theta}{\int_{-\pi-\Delta\theta}^{\pi-\Delta\theta} (W_{RF} \cdot X_F(\theta) + W_{RR} \cdot X_R(\theta)) d\theta} \right)$$

where θ is the angle of incidence in relation to the direction the front microphone is pointing.

At 408 additional constraints are defined. The additional constraints can be defined according to the needs of the user. In one particular example the additional constraints require the maximums of the constrained equation to be searched for under the constraint of unit gain and zero phase shift.

A non-constrained optimization equation is formed at 410. The non-constrained optimization equation is formed from the constraint equation ($Q_{Fconst}$, $Q_{Rconst}$) and the additional constraints. The unknown filter functions of the constrained equation, are part of the non-constrained optimization equation and once the equation is enhanced they provide the front and rear filters, 308 and 310, with information to enhance (e.g., optimize) the suppression of the opposite channel (e.g., signal).

At 412 the non-constrained optimization equation is enhanced and the filter functions $W_{FF}$, $W_{FR}$, $W_{RF}$, $W_{RR}$ are extracted. The non-constrained optimization equation can be enhanced using numerical methods (e.g., gradient descent method). The extracted filter functions are utilized to act on the incoming signals $X_F(f)$ and $X_R(f)$, thereby resulting in the suppressed audio signal $Y_F(f)$ which has as much as possible from the front audio signal and as little as possible from the rear audio signal, and the suppressed audio signal $Y_R(f)$ has as much as possible from the rear audio signal and as little as possible from the front audio signal.

Figure 5:
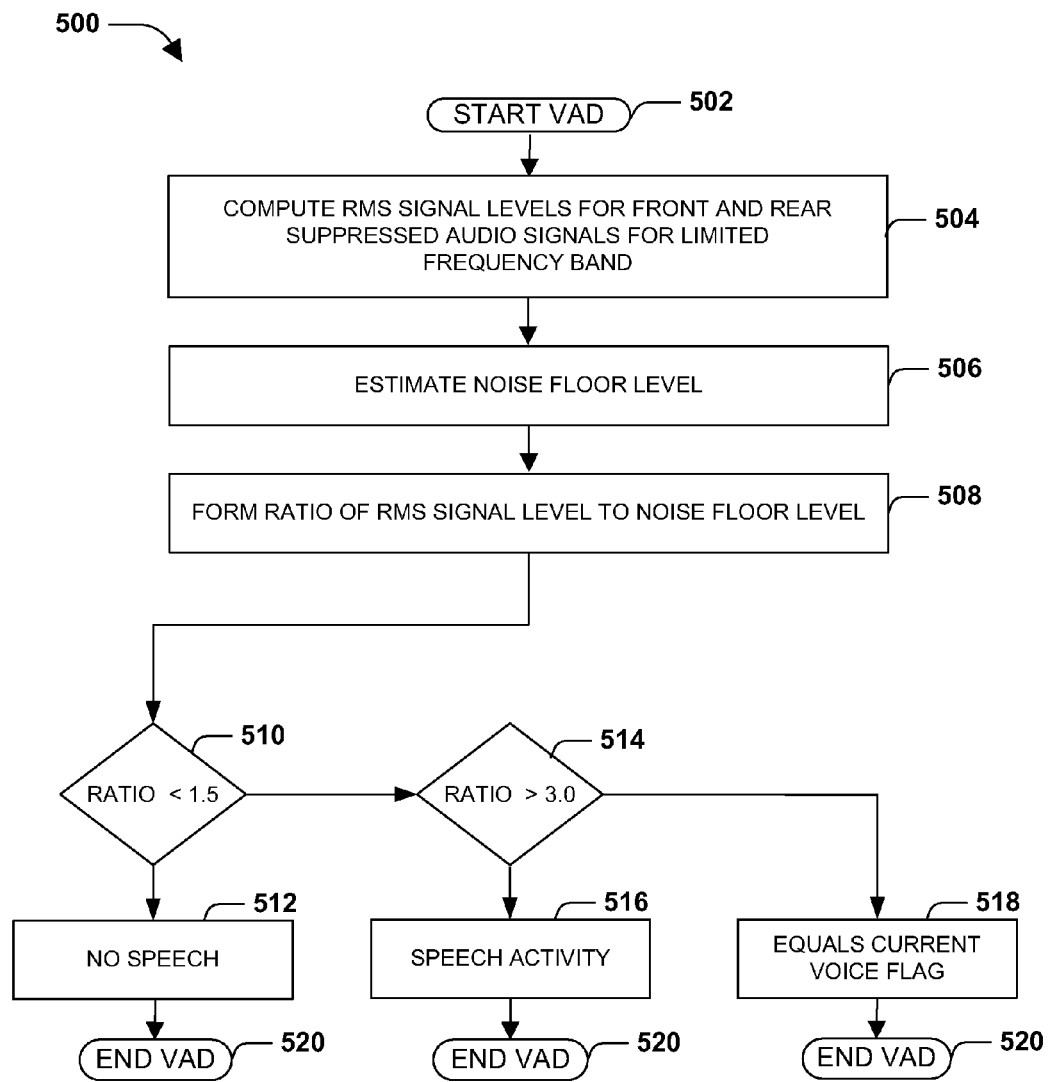
FIG. 5 is a flow chart illustrating an exemplary method of voice activation detection.

FIG. 5 is a flow chart illustrating an exemplary method of voice activation detection. Voice activation detection provides a method by which the algorithm can determine whether or not a captured audio signal is speech or noise. In the exemplary method 500, the voice activation detection provides a binary decision of speech (e.g., voice) or no speech (e.g., no voice).

At 504 a root mean square (RMS) signal level for the front and rear suppressed audio signals are computed for a limited frequency band range. The RMS signal level provides an estimation of the level (e.g., energy) of the sound for the front and rear suppressed audio signals. A limited frequency band range is used because the lower part of the frequency band comprises too much noise energy, while the higher part of the frequency band comprises too low speech energy. The limited frequency band range may be between 300 and 6500 Hz, for example.

A noise floor level (e.g., energy) is estimated at 506. The noise floor level is a measure of an audio signal created from a sum of all noise sources and unwanted signals within a system. For example, the noise floor level can be estimated according to the following equations:

$$L_{min}^{(n)} = \left| \begin{array}{ll} \left(1 - \frac{T}{\tau_{up}}\right) L_{min}^{(n-1)} + \frac{T}{\tau_{up}} L^{(n)} & L^{(n)} > L_{min}^{(n-1)} \\ \left(1 - \frac{T}{\tau_{down}}\right) L_{min}^{(n-1)} + \frac{T}{\tau_{down}} L^{(n)} & L^{(n)} \le L_{min}^{(n-1)} \end{array} \right.$$

where T is the audio frame duration (e.g. 20 mS). Calculation of the noise floor level uses a two time constant approach that can also be used in other parts of this algorithm. The estimated noise floor level is defined such that if the estimated energy $L^{(n)}$ is larger than a current minimum value $L_{min}^{(n-1)}$, the function $L_{min}^{(n)}$ slowly increases by adding the noise level to the current minimum value $L_{min}^{(n-1)}$ using a first time constsnt $T_{up}$ (e.g., 20 s) as shown in the above equation. If the current energy $L^{(n)}$ is lower than the current minimum value $L_{min}^{(n-1)}$, the function $L_{min}^{(n)}$ will be tracked. To do this a second time constant, $T_{down}$ (e,g,. 30 ms), is used as shown in the above equation.

At 508 the ratio between the RMS signal level and the noise floor level is computed. The ratio is computed respectively for the front and rear suppressed audio signals, $Y_F(f)$ and $Y_R(f)$. The resultant ratio can be used to determine whether a captured signal is a voice or not a voice according to an activity flag criteria. For example, an activity flag V can be set according to the following equation:

$$V^{(n)} = \begin{vmatrix} 0 & \text{if } \frac{L^{(n)}}{L^{(n)}_{min}} < 1.5 \\ 1 & \text{if } \frac{L^{(n)}}{L^{(n)}_{min}} < 3.0 \\ V^{(n-1)} & \text{otherwise} \end{vmatrix}$$

If the ratio of the RMS signal level to the noise floor level is less than 1.5 (510), then the voice activity flag V is set equal to a value of 0 indicating that the captured signal is not speech (e.g., a voice) 512. If the ratio of the RMS signal level to the noise floor level is greater than 3.0 (514), than the voice activity flag V is set equal to a value of 1, indicating that the captured signal is speech (e.g., voice) 516. If the ratio of the RMS signal level to the noise floor level is between 1.5 and 3.0 (e.g., an ambiguous level) than the voice flag remains unchanged from the current frame (n–1) 518. The setup of the voice activity flag, as illustrated above, shows that the flag will be set to a high value while words are being spoken and a low value when words are not being spoken.

Figure 6:
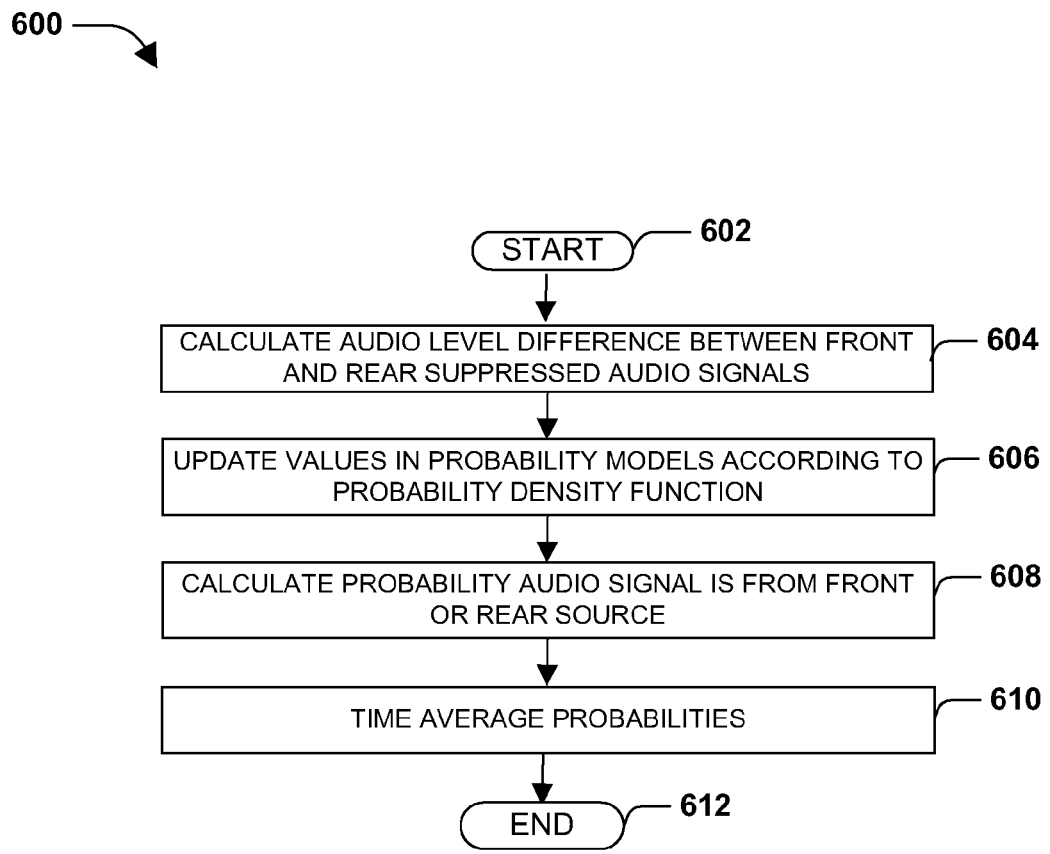
FIG. 6 is a flow chart illustrating an exemplary method for extracting a levels difference feature (e.g., for the whole frame or per frequency bin) from the suppressed audio signal and calculating the probability that the signal is from the front or the rear microphone.

FIG. 6 is a flow chart illustrating an exemplary method for extracting a level (e.g., energy) difference feature (e.g., for the whole frame or per frequency bin) from the suppressed audio signals and calculating the probability that the signal is from a front or a rear source.

At 604 the audio level (e.g., energy) difference between the front and rear suppressed audio signals are calculated for a current frame n. Differences between the front and the rear suppressed audio signals may occur due to manufacturing tolerances, for example.

The audio level difference is used to update values in probability models by updating the parameters of the probability density function of speech and noise at 606. In general, the probability density function uses probabilistic models with certain distribution, which can be the same or different for the speech and noise signals for the difference between the front and the rear suppressed audio signals. In one example, a non-Gaussian distribution (e.g., Gamma distribution or Laplacian distribution) can be used as the probability density function for speech, to correspond to the captured difference between the front and the rear suppressed audio signals. In such an example, the difference between front and rear audio signals can be modeled according to a Gamma distribution or Laplace distribution, while the noise can be modeled according to a Gaussian distribution. In a more sophisticated example, a Gaussian distribution may be used for modeling noise, but for speech, if the level (e.g., energy) difference between the front and rear signals is greater than 0 a one-sided Gamma distribution may be used for adjustment and if the level difference between the front and rear signals is less than 0 a Gaussian distribution may be used for adjustment. The same model can be applied for the opposite case just by changing the sign of the difference.

At 608 the probability a suppressed audio signals is from a front or a rear source is calculated from the probability density functions. The probability distributions of the front signal, the rear signal, and the noise can be used to build a probabilistic model. The probabilistic model allows a probability that a signal is from a front or a rear source to be calculated given different $\Delta L$. For example, the probability that a suppressed audio signal is from a front or a rear source can be given by:

$$\hat{p}^{(n)}_{FW} = \frac{P_{FW}(\Delta L^{(n)}_W)}{P_{FW}(\Delta L^{(n)}_W) + P_{RW}(\Delta L^{(n)}_W) + P_{NW}(\Delta L^{(n)}_W)}$$

$$\hat{p}^{(n)}_{RW} = \frac{P_{RW}(\Delta L^{(n)}_W)}{P_{FW}(\Delta L^{(n)}_W) + P_{RW}(\Delta L^{(n)}_W) + P_{NW}(\Delta L^{(n)}_W)}$$

where $P_{FW}$ is the probability density function associated with a signal from a front source for a whole frame, $P_{RW}$ is the probability density function associated with a signal from a rear source for a whole frame, $P_{NW}$ is the probability density function associated with noise for a whole frame. A probability model can be similarly formed following the same acts to determine the probability that a signal is from the front or rear for the level difference (e.g, $\Delta L$) per frequency bin.

The probabilities are time averaged at 610. Time averaging is performed using a two time constant approach similar to that used to determine the noise floor above. For example, time averaging equations can be written as:

$$p^{(n)}_{FW} = \begin{vmatrix} (1-\alpha_W)p^{(n-1)}_{FW} + \alpha_W \hat{p}^{(n)}_{FW} & \hat{p}^{(n)}_{FW} > p^{(n-1)}_{FW} \\ (1-\delta_W)p^{(n-1)}_{FW} + \delta_W \hat{p}^{(n)}_{FW} & \hat{p}^{(n)}_{FW} \le p^{(n-1)}_{FW} \end{vmatrix}$$

$$p^{(n)}_{RW} = \begin{vmatrix} (1-\alpha_W)p^{(n-1)}_{RW} + \alpha_W \hat{p}^{(n)}_{RW} & \hat{p}^{(n)}_{RW} > p^{(n-1)}_{RW} \\ (1-\delta_W)p^{(n-1)}_{RW} + \delta_W \hat{p}^{(n)}_{RW} & \hat{p}^{(n)}_{RW} \le p^{(n-1)}_{RW} \end{vmatrix}$$

where time constants $\alpha_W$ and $\delta_W$ are used in time averaging of the probabilities of each set of features are left to be optimized according to the optimization of the overall probability function. Time averaging both the level difference for a whole frame and level difference per frequency bin will result in two time constants each ($\alpha_W, \delta_W$ and $\alpha_{Wb}$ and ($\delta_{Wb}$).

Figure 7:
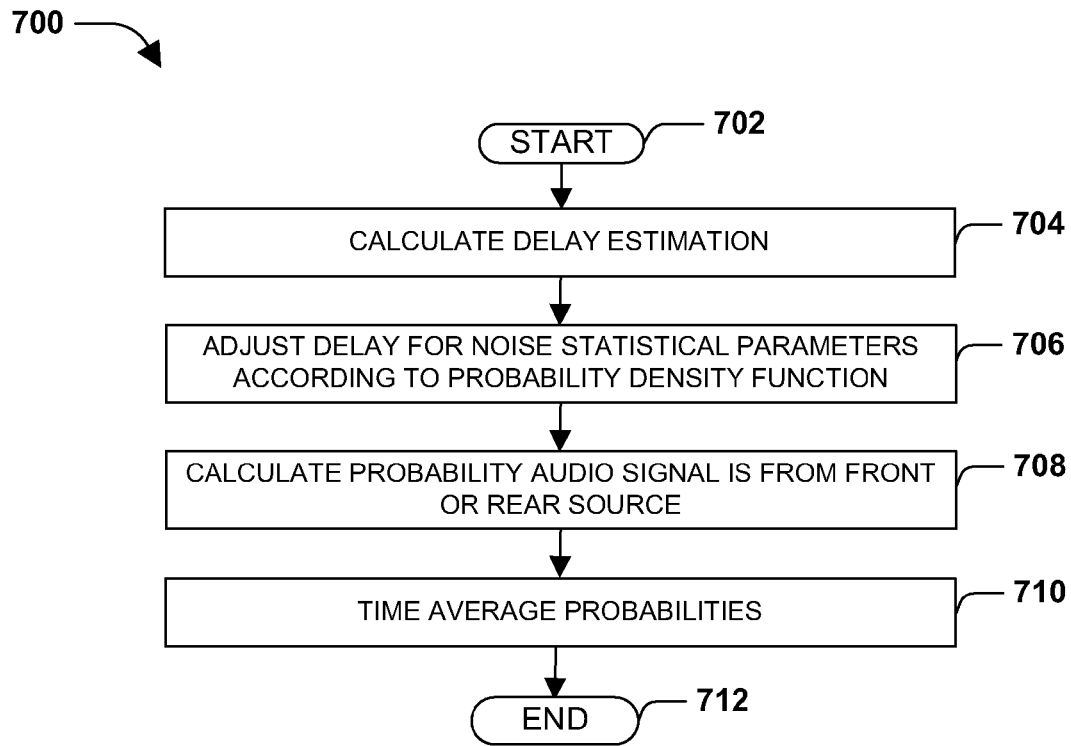
FIG. 7 is a flow chart illustrating an exemplary method for extracting a time of arrival feature (e.g., for the whole frame or per frequency bin) from the suppressed audio signal and calculating the probability that the signal is from the front or the rear microphone.

FIG. 7 is a flow chart illustrating an exemplary method for extracting a time of arrival (e.g., for the whole frame or per frequency bin) from the frequency domain audio signals and calculating the probability that the signal is from a front or a rear source.

At 704 a delay estimate is calculated. In one example, the delay is estimated as the maximum of a Phase Transform (PHAT) weighted and band limited cross correlation function of the two input channels (e.g., front and rear). The resultant delay estimate between front and rear frequency domain audio signals can be used to distinguish signals coming from the front, rear, and ambient noise. A difference in an average time of arrival is due to manufacturing tolerances such as phase mismatch in microphones or preamplifiers.

The delay estimate is modeled according to the probability density function of speech amplitude at 706. This adjustment compensates for difference in time caused by manufacturing tolerances. In one example, a Gaussian probability density function can be used to adjust the delay estimate for the front signal, the rear signal, and noise.

At 708 the probability a frequency domain audio signals is from a front or a rear source is calculated from the probability density functions. The probability distributions of the front signal, the rear signal, and the noise are used to build a probabilistic model. For example, the probability that a frequency domain audio signal is from a front or a rear source can be given by:

$$\hat{p}_{FD}^{(n)} = \frac{P_{FD}(D^{(n)})}{P_{FD}(D^{(n)}) + P_{RD}(D^{(n)}) + P_{ND}(D^{(n)})}$$

$$\hat{p}_{RD}^{(n)} = \frac{P_{RD}(D^{(n)})}{P_{FD}(D^{(n)}) + P_{RD}(D^{(n)}) + P_{ND}(D^{(n)})}$$

where $P_{FD}$ is the probability density function associated with a signal from the front for a whole frame, $P_{RD}$ is the probability density function associated with a signal from the rear for a whole frame, $P_{ND}$ is the probability density function associated with noise for a whole frame. A probability model can be similarly formed following the same acts to determine the probability that a signal is from a front or a rear source for the time of arrival difference (e.g., $D^{(n)}$) per frequency bin.

The probabilities are time averaged at 710. As in the level difference approach of FIG. 6, time averaging is performed using a two time constant approach similar to that used to determine the noise floor above. For example, the time averaging equations can be written as:

$$p_{FD}^{(n)} = \begin{vmatrix} (1-\alpha_D)p_{FD}^{(n-1)} + \alpha_D \hat{p}_{FD}^{(n)} & \hat{p}_{FD}^{(n)} > p_{FD}^{(n-1)} \\ (1-\delta_D)p_{FD}^{(n-1)} + \delta_D \hat{p}_{FD}^{(n)} & \hat{p}_{FD}^{(n)} \leq p_{FD}^{(n-1)} \end{vmatrix}$$

$$p_{RD}^{(n)} = \begin{vmatrix} (1-\alpha_D)p_{RD}^{(n-1)} + \alpha_D \hat{p}_{RD}^{(n)} & \hat{p}_{RD}^{(n)} > p_{RD}^{(n-1)} \\ (1-\delta_D)p_{RD}^{(n-1)} + \delta_D \hat{p}_{RD}^{(n)} & \hat{p}_{RD}^{(n)} \leq p_{RD}^{(n-1)} \end{vmatrix}$$

where the two time constants $\alpha_D$ and $\delta_D$ used in time averaging of the probabilities of each set of features are left to be enhanced (e.g., optimized) according to the optimization of the overall probability function. Time averaging both time of arrival difference for a whole frame, and time of arrival difference per frequency bin will result in two time constants each ($\alpha_D$, $\delta_D$ and $\alpha_{Db}$ and $\delta_{Db}$) making a total of eight time constants (and four minimal gains) that are enhanced when determining the overall probability.

Figure 8:
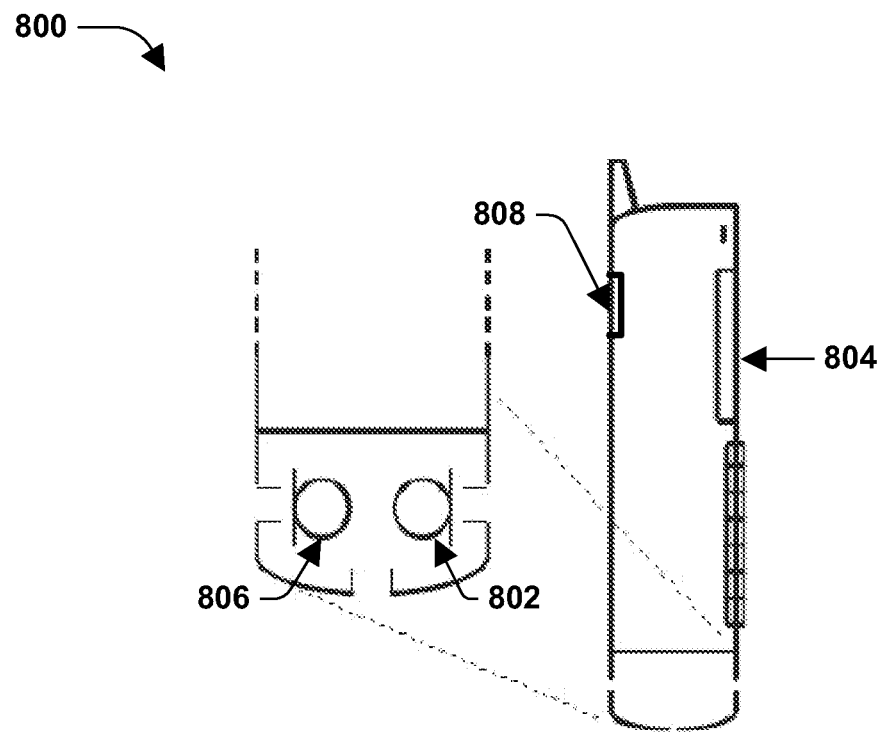
FIG. 8 is an illustration of a telecommunication device cellular phone set forth herein.

FIG. 8 illustrates an exemplary telecommunication device 800 (e.g., cellular phone). The telecommunication device 800 has a front microphone 802 situated on the same side as an interface screen 804. The telecommunication device 800 also has a rear microphone 806 configured on the opposite side as the front microphone 802 and the same side as a video recording device 808 (e.g., camera, video camera). The telecommunication device 800 can be configured to receive audio signals from both the front microphone 802 and the rear microphone 806 and processes the audio signals according to the method of FIG. 2.

Figure 9:
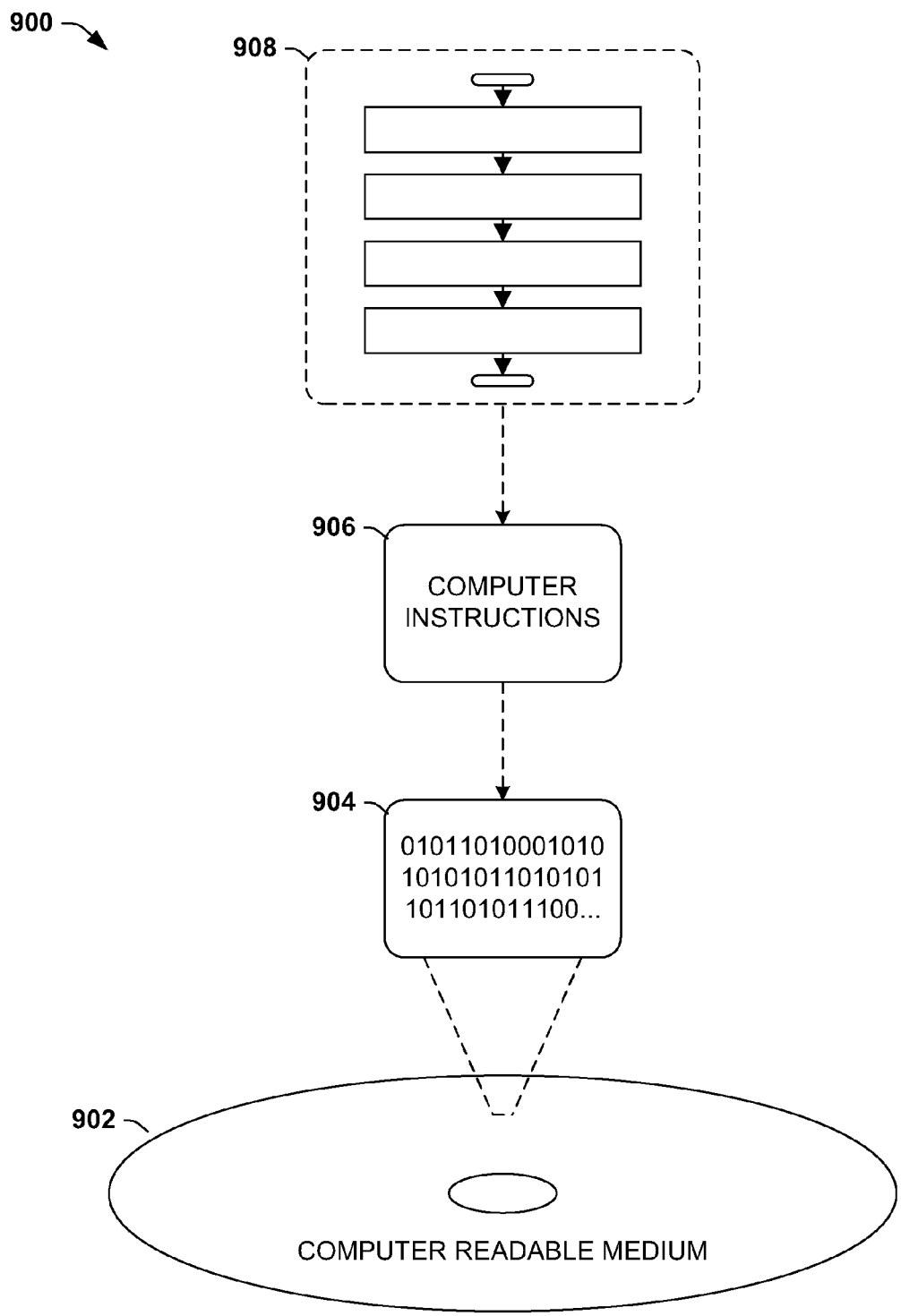
FIG. 9 is an illustration of an exemplary computer-readable medium comprising processor-executable instructions configured to embody one or more of the provisions set forth herein.

Still another embodiment involves a computer-readable medium comprising processor-executable instructions configured to apply one or more of the techniques presented herein. An exemplary computer-readable medium that may be devised in these ways is illustrated in FIG. 9, wherein the implementation 900 comprises a computer-readable medium 902 (e.g., a CD-R, DVD-R, or a platter of a hard disk drive), on which is encoded computer-readable data 904. This computer-readable data 904 in turn comprises a set of computer instructions 906 configured to operate according to one or more of the principles set forth herein. In one such embodiment, the processor-executable instructions 906 may be configured to perform a method of 908, such as the exemplary method 200 of FIG. 2, for example. In another such embodiment, the processor-executable instructions 906 may be configured to implement a system configured to improve the relevance rank of web searches for a query. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
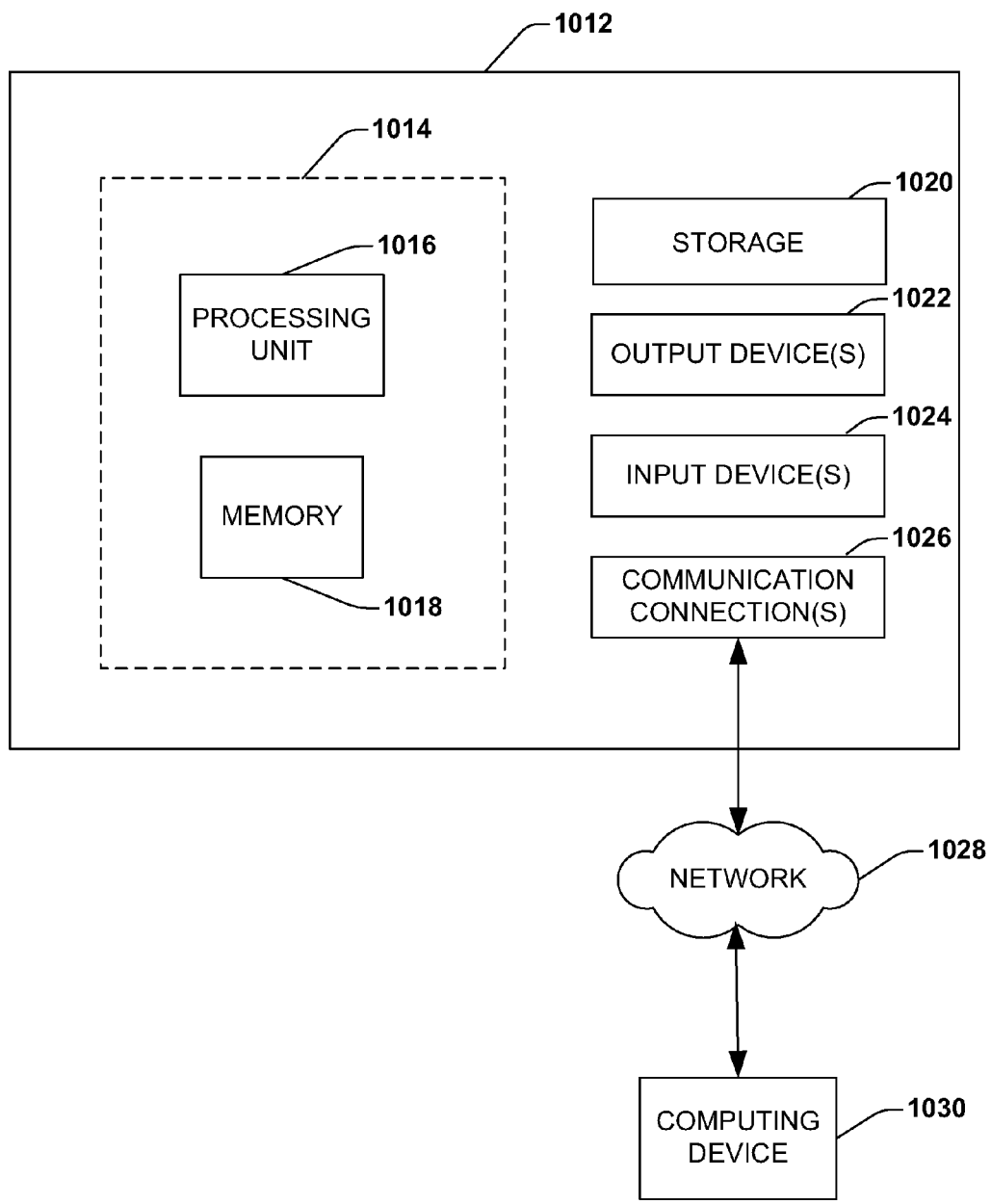
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for processing audio signals, comprising:
capturing a sound at a first microphone oriented in a first direction to generate a first audio signal;
capturing the sound at a second microphone oriented in a second direction, different than the first direction, to generate a second audio signal;
computing a first probability indicative of a likelihood that the sound was emitted toward the first microphone, comprising:
comparing a first feature of the first audio signal to a first feature of the second audio signal to derive a first feature probability, and
determining a trust level for the first feature probability to determine a contribution of the first feature probability to the first probability;
computing a second probability indicative of a likelihood that the sound was emitted toward the second microphone;
altering the first audio signal as a function of the first probability to generate a first enhanced audio signal; and
altering the second audio signal as a function of the second probability to generate a second enhanced audio signal, the second audio signal altered in a different manner than the first audio signal such that the second audio signal is suppressed relative to the first audio signal when there is a greater likelihood that the sound was emitted toward the first microphone than toward the second microphone.

2. The method of claim 1, comprising:
filtering the first audio signal prior to altering the first audio signal.

3. The method of claim 2, the filtering comprising:
filtering the first audio signal as a function of the second audio signal.

4. The method of claim 1, comprising:
converting the first audio signal from a time domain to a frequency domain prior to altering the first audio signal.

5. The method of claim 1, comprising:
converting the first audio signal from an analog domain to a digital domain prior to altering the first audio signal.

6. The method of claim 1, comprising:
amplifying the first enhanced audio signal based at least in part on automatic gain control.

7. The method of claim 1, the capturing a sound at a first microphone and the capturing a sound at a second microphone comprising capturing the sound by a cellular telephone comprising the first microphone and the second microphone.

8. The method of claim 1, the comparing comprising at least one of:
comparing an energy of the first audio signal for a frame to an energy of the second audio signal for the frame,
comparing a time of arrival of the sound as represented in the first audio signal for the frame to a time of arrival of the sound as represented in the second audio signal for the frame,
comparing an energy of the first audio signal for a frequency bin to an energy of the second audio signal for the frequency bin, or
comparing a time of arrival of the sound as represented in the first audio signal for the frequency bin to a time of arrival of the sound as represented in the second audio signal for the frequency bin.

9. The method of claim 1, comprising, mixing the first enhanced audio signal with the second enhanced audio signal to generate an output signal.

10. The method of claim 1, comprising, prior to altering the first audio signal:
converting the first audio signal from a time domain to a frequency domain; and
filtering the first audio signal as a function of the second audio signal.

11. A system for processing audio signals, comprising:
a first microphone oriented in a first direction and configured to capture a sound emitted by a source;
a second microphone oriented in a second direction, different than the first direction, and configured to capture the sound;
a feature extractor component configured to:
compute a first probability indicative of a likelihood that the sound was emitted toward the first microphone, the computing comprising:
comparing a first feature of a first audio signal generated from the sound captured by the first microphone to a first feature of a second audio signal generated from the sound captured by the second microphone to derive a first feature probability, and
determining a trust level for the first feature probability to determine a contribution of the first feature probability to the first probability;
compute a second probability indicative of a likelihood that the sound was emitted toward the second microphone;
a first estimator component configured to alter the first audio signal as a function of the first probability to generate a first enhanced audio signal; and
a second estimator component configured to alter the second audio signal as a function of the second probability to generate a second enhanced audio signal.

12. The system of claim 11, comprising:
a first filter component configured to filter the first audio signal prior to the feature extractor component deriving the first feature probability.

13. The system of claim 12, the first filter component configured to filter the first audio signal as a function of the second audio signal.

14. The system of claim 11, comprising an analog-to-digital converter component configured to at least one of:
convert the first audio signal from an analog domain to a digital domain prior to the feature extractor component deriving the first feature probability; or
convert the first audio signal from a time domain to a frequency domain prior to the feature extractor component deriving the first feature probability.

15. The system of claim 11, the feature extractor component configured to:
compare a second feature of the first audio signal to a second feature of the second audio signal to derive a second feature probability; and
determine a trust level for the second feature probability to determine a contribution of the second feature probability to the first probability.

16. The system of claim 15, the first feature of the first audio signal related to an energy of the first audio signal, the first feature of the second audio signal related to an energy of the second audio signal, the second feature of the first audio signal related to a time of arrival of the sound as represented in the first audio signal, and the second feature of the second audio signal related to a time of arrival of the sound as represented in the second audio signal.

17. A computer-readable storage device comprising computer-executable instructions, which when executed at least in part via a processing unit perform a method, comprising:
   capturing a sound at a first microphone oriented in a first direction to generate a first audio signal;
   capturing the sound at a second microphone oriented in a second direction, different than the first direction, to generate a second audio signal;
   computing a first probability indicative of a likelihood that the sound was emitted toward the first microphone, comprising:
      comparing a first feature of the first audio signal to a first feature of the second audio signal to derive a first feature probability, and
      determining a trust level for the first feature probability to determine a contribution of the first feature probability to the first probability;
   computing a second probability indicative of a likelihood that the sound was emitted toward the second microphone;
   altering the first audio signal as a function of the first probability to generate a first enhanced audio signal; and
   altering the second audio signal as a function of the second probability to generate a second enhanced audio signal, the second audio signal altered in a different manner than the first audio signal.

18. The computer-readable storage device of claim 17, comprising:
   mixing the first enhanced audio signal with the second enhanced audio signal.

19. The computer-readable storage device of claim 17, comprising:
   amplifying the first enhanced audio signal based at least in part on automatic gain control.

20. The computer-readable storage device of claim 17, comprising:
   converting the first audio signal from a time domain to a frequency domain prior to altering the first audio signal.

* * * * *